July 2, 1963 D. T. CAHILL 3,095,785
POSITIONING DEVICE
Filed Aug. 18, 1960 3 Sheets-Sheet 1
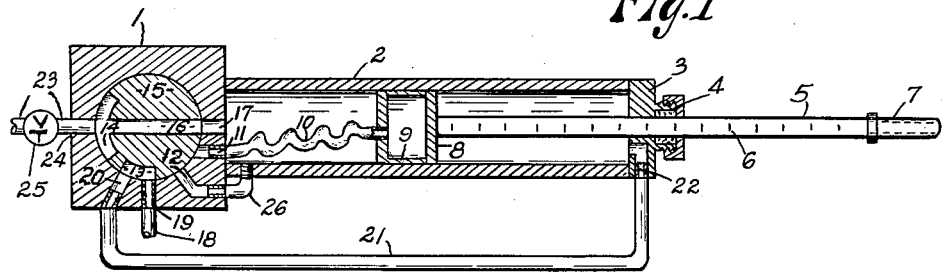
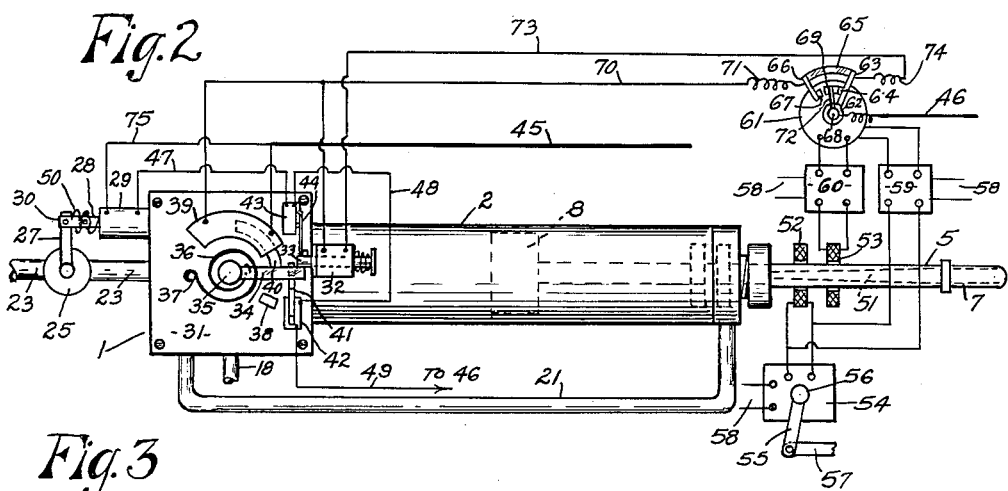
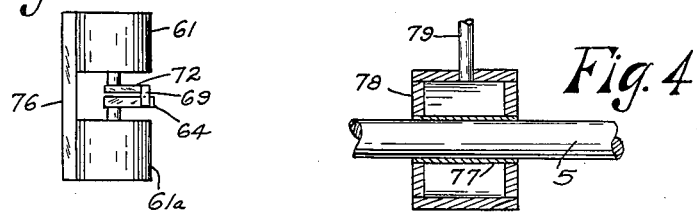
INVENTOR.
Daniel T. Cahill

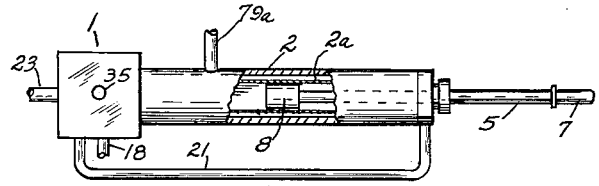
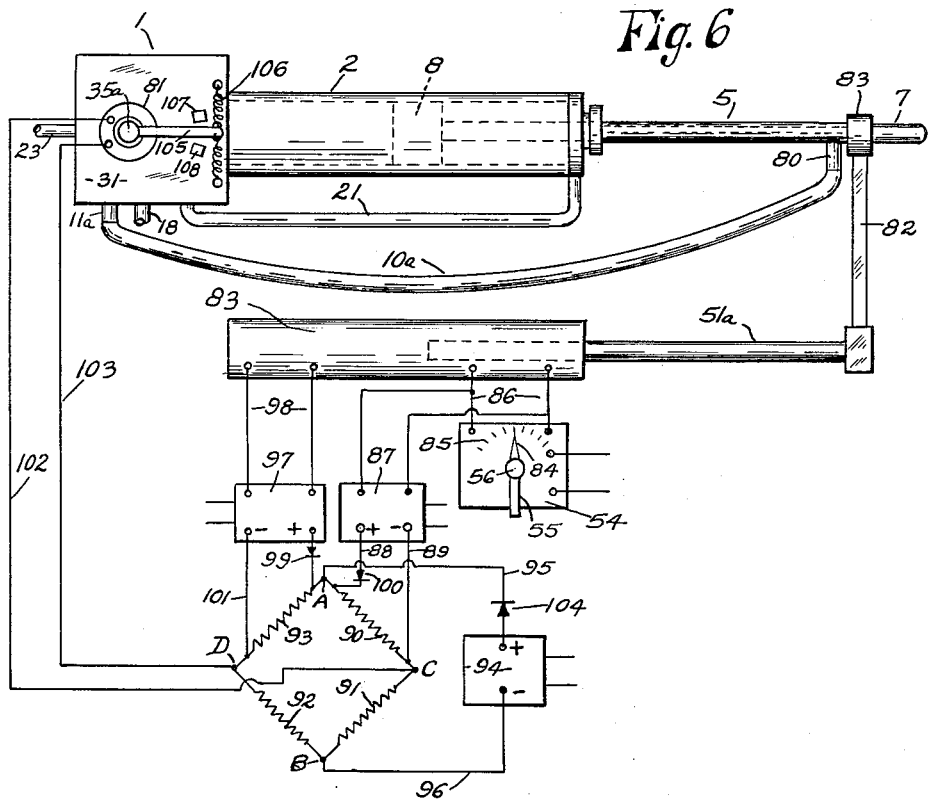

July 2, 1963 D. T. CAHILL 3,095,785
POSITIONING DEVICE
Filed Aug. 18, 1960 3 Sheets-Sheet 3
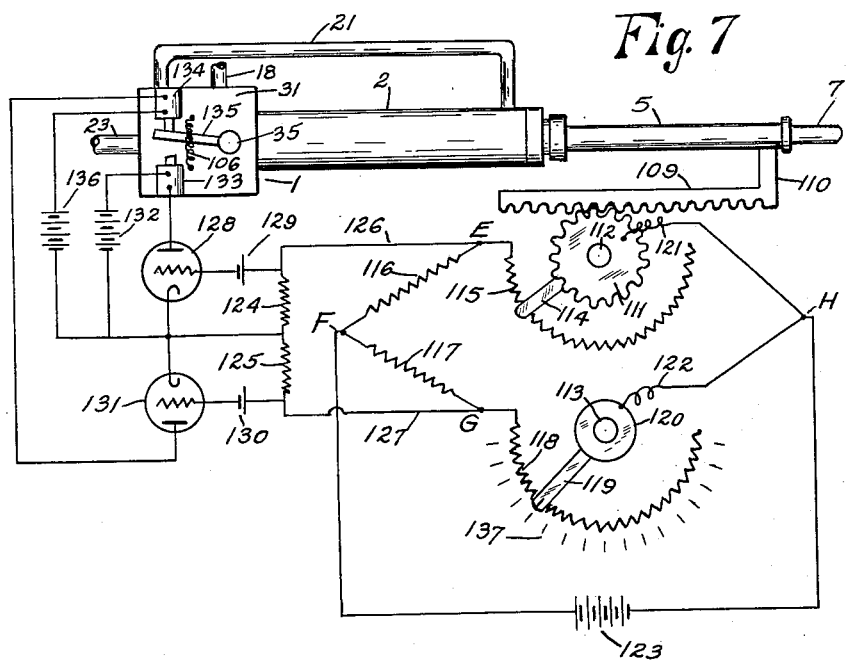
INVENTOR.

3,095,785
                                POSITIONING DEVICE
            Daniel T. Cahill, Glen Head, N.Y., assignor to Specialties,
                    Incorporated, Syosset, Long Island, N.Y.
                       Filed Aug. 18, 1960, Ser. No. 50,364
                            8 Claims. (Cl. 91—42)

This invention relates to fluid actuated power and positioning devices.

In operating many machines, systems, and devices of wide variety it is often required that a part of the machine be moved through a definite displacement and with considerable force. As an illustration, machine tool slides for lathes, turret lathes, and for other machine tools can be positioned very accurately with my hydraulic or pneumatic power and positioned device. The device combines accurate control means and at the same time powerful actuating force. This unique combination of accuracy of positioning and strong force can be applied to numerous machines and devices, including automatic machine tool systems, indexing operations, and others.

An object is to provide a fluid operated member which will be automatically moved to a precise position.

Another object is to provide a fluid operated member which will be automatically moved to a precise position as a result of manual or mechanical setting of a control member.

A further object is to provide means moved by fluid with considerable force and brought to rest in a precise position, the means being locked in that position.

An additional object is to provide a novel, expansible piston in a cylinder.

Another object is to provide a novel expansible cylinder for clamping a piston.

Further objects are to provide novel means for sensing displacements or positions of objects and means for automatically or mutually controlling such displacements.

Other objects will be evident in the following description.

FIGURE 1 is a part sectional side elevation of an actuating cylinder and expansible piston, and piston rod, and control valve of my device or system.

FIGURE 2 is a side elevation of my positioning and power system, showing an electromagnetically controlled valve and inductive pick-up windings.

FIGURE 3 is a side elevation showing two electrical instruments and cooperating contact arms.

FIGURE 4 is a part sectional side elevation showing a fragment of a piston rod and a fluid operated clamping device.

FIGURE 5 is a part sectional side elevation of a double wall cylinder for clamping the piston of my actuator.

FIGURE 6 is a side elevation of a modification of my positioning and power system, employing a variable impedance.

FIGURE 7 is a side elevation of another modification of my combined positioning and power system for machine tools and other devices.

In FIGURE 1, valve casing 1 is integral with or fastened to cylinder 2 which has cap or head 3 screwed or bolted thereto in leak-proof manner. Packing gland 4 is provided to prevent leakage of fluid around piston rod 5 which may be marked with spaced division indicators 6 if desired. The piston rod has an end portion 7 which may be attached to a slide or other element by means of threads, pins, or in any suitable manner. Piston 8 has relatively thin circumferential wall 9 which may be expanded by fluid in order to clamp or lock the piston in desired position in the cylinder.

Flexible tube 10 of rubber, silicone rubber or other plastic, or metal, is fastened in a port in the piston wall adjacent to the tube. The tube may be clamped around a nipple in the piston wall or it may be fastened around a threaded coupling which can be screwed into threads in a hole in the piston wall.

The other end of the tube is similarly connected with port 11 in casing 1. The rotary valve member 15 has recesses 13, 14 and 16. The latter passes through the member 15 and may be aligned with port 17 in valve casing 1, the interior of which is cylindrical and closely fitted around rotatable cylindrical valve element 15. Port 17 leads into cylinder 2 on the left side of piston 8. Discharge pipe 18 is connected with port 19 in the valve casing. Port 20, is connected with pipe 21 the other end of which is connected with channel or port 22 in cap 3. This channel leads into cylinder 2 to the right of piston 8. Port 12 in the valve casing is situated as indicated and L 26 connects this port with the interior of cylinder 2 to the left of piston 8. This L may be fastened in a hole in the wall of cylinder 2 by means of threads or in other manner such as by welding or sealing in any suitable way.

Inlet pipe 23 is threaded or otherwise fastened in port 24 in valve casing 1. This port is diametrically opposite to port 17. Valve 25 may be connected in inlet line 23 in order to control the flow of fluid to the cylinder. Supply pipe or line 23 is connected to a source of liquid or air under pressure. The ports and recesses are so placed that when the valve is in the position shown, the pressure fluid from pipe 23 passes through recess 14, channel 16, port 17, and into cylinder 2, causing piston 8 to move to the right. Valve recess 13 connects pipe 21 with discharge pipe 18 so that the piston can force any fluid in the cylinder 2 to the right of the piston out through the discharge pipe which may carry the fluid back to a tank or reservoir. At the same time, ports 11 and 12 will be blocked by the valve element 15. The folds in flexible tube 10 will allow movement of the piston.

When it is desired to stop the movement of piston 8 and connected rod 5 the valve element 15 is rotated clockwise until channel 16 is in register with port 11, resulting in the pressure fluid being connected with flexible tube 10 and the interior of hollow piston 8. This fluid forces thin piston wall 9 slightly outward thereby frictionally locking the piston to the surrounding cylinder wall. When valve element 15 is in that position the elongated recess or channel 14 and channel 16 are still in communication with pipe 23 and discharge port 19 is sealed by valve element 15. If it is then desired to move the piston and attached rod to the left the valve element 15 is rotated counter clockwise until recess 14 is in register with port 20 and recess 13 connects ports 19 and 12. Then the right end of channel 16 is closed by the valve casing inner wall, and ports 17 and 11 are closed by a solid portion of element 15. Under these conditions fluid is forced through pipe 21 and channel 22 and into cylinder 2, thereby moving piston 8 to the left. Fluid to the left of the piston will be discharged from the cylinder through L 26 and connected discharge pipe 18.

When it is desired to lock the piston again the valve element 15 is rotated clockwise until channel 16 is in register with port 11 or if it is desired to move piston 8 to the right the channel 16 is again rotated into register with port 17, as shown. In order to prevent movement of the piston as element 15 is rotated from its extreme counter clockwise position to its extreme clockwise position, the arrangement shown in FIGURE 2 may be used. The cutoff valve 25 has operating arm 27 connected to plunger 28 of solenoid 29 by means of pivoted link 30. The valve is open when the arm is in the position shown but when solenoid 29 is energized the plunger is pulled into it, rotating arm 27 sufficiently to close the valve. Spring 50 normally maintains the valve in open condition. The solenoid is attached to casing 1 which may have cover plate 31 fastened to it by means of screws or in other manner.

Solenoid 32 having plunger 33 is attached to valve casing 1 and compression spring around this plunger normally holds the stop lug near the left end of the plunger against the left face of the solenoid. The rear portion of the plunger is iron and the forward portion is brass. When this solenoid is energized it is in the position shown, acting as a stop for valve arm 34 which extends from valve stem 35 connected with valve element 15 illustrated in FIGURE 1. The housing or casing 1 of FIGURE 2 contains the valve arrangement shown in FIGURE 1. Spiral spring 36, attached to arm 34 and to pin 37 on cover plate 31, normally urges arm 34 in clockwise direction against stop 38. Arcuate solenoid winding 39 is attached to plate 31 and similarly curved cooperating plunger 40 is attached to arm 34. Stem 35 passes through a hole in plate 31 and is suitably packed to prevent leakage. A gasket may be placed between plate 31 and the edge of casing 1.

Arm 41 of "Microswitch" or similar switch 42 has a peaked portion which is struck by valve arm 34 as it swings in either direction. When the peak is depressed by the arm the switch is closed and this occurs when valve element 15 is in a position to direct fluid through port 17. Similar switch 43 having operating arm 44 is attached to plate 31 and its arm is pushed to the left to open switch 43 when the lug on plunger 33 strikes it upon energization of solenoid 32. Switch 43 is normally closed and switch 42 is normally open.

One terminal of solenoid winding 29 is connected to electrical line 45 and the other terminal is connected to associated electrical line 46, through conductors 47, 48, 49 and switches 42 and 43 in series. The lines 45—46 may carry A.C. or D.C. current but alternating current will cause less contact troubles. Electronic or other types of switches can be used.

When arm 34 is pulled against solenoid 39 upon energization thereof the valve element 15 of FIGURE 1 is in a position in which recess 14 is in register with port 20 so that fluid will be passed through pipe 21 to move piston 8 to the left. When valve arm 34 is in the position shown in FIGURE 2, against extended plunger 33 as a stop, the valve element 15 is in the position shown in FIGURE 1, to supply fluid to port 17 causing movement of piston 8 to the right. When solenoids 32 and 39 are deenergized the plunger 33 is moved to the right by means of its spring and spiral spring 36 quickly snaps arm 34 back against stop 38. Under these conditions channel 16 of valve element 15 is in register with port 11 and fluid is supplied to the interior of piston 8 through flexible tube 10, thereby locking the piston in its position in cylinder 2. The solenoids are designed so that plunger 33 will reach its position shown before arm 34 passes it. It will therefore serve as a stop for arm 34 when the solenoids 32 and 39 are simultaneously energized. If desired a condenser or other time delay means can be connected across solenoid winding 39.

When solenoids 32 and 39 are simultaneously energized the plunger 33 is quickly snapped to the left to act as a stop for arm 34 which is swung counter clockwise with pivot 35 as a result of plunger 40 being pulled into energized solenoid 39. Since arm 44 of switch 43 is struck to open this switch before the peaked or cam portion of arm 41 is struck by arm 34 to close switch 42, the solenoid 29 in series with both switches will not be energized and valve arm 27 will remain in the open valve position shown. If, however, the solenoids 32 and 39 are deenergized and spring 36 is returning arm 34 to its rest position against stop 38 the circuit to solenoid 29 will be closed as arm 34 passes over the cam portion of switch arm 41 and solenoid 29 will be momentarily energized to rotate valve arm 27 sufficiently to close valve 25 while element 15 is passing through the position shown in FIGURE 1. In this way pressure fluid will not be supplied to cylinder 2 through port 17 to cause movement of piston 8 when arm 34 is being returned to normal or rest position by spring 36. It is assumed that the spring around plunger 33 is strong enough to move the left end of that plunger out of the way of arm 34 before being struck by that arm on return strokes. This closing of valve 25 when valve element 15 is near the position shown in FIGURE 1 will occur when arm 34 is released after being pulled against solenoid 39.

Piston rod 5 of FIGURE 2 contains elongated tapered iron or steel rod 51 coaxial therewith. The outer covering of the cylindrical composite rod is made of non-magnetic and non-conductive material such as ceramics, plastic, ebony or other hard wood, glass, or the equivalent. The tapered magnetizable element 51 can be placed in a cylindrical tube of non-conductive material and can be cemented in place, coaxial with the tube. It is preferable to use a soft or resilient type of cement to allow for a possible difference in coefficients of expansion of the material of core member 51 and the surrounding tube. Suitable plastic material is epoxy or the like although other plastics may be used. It is not essential that the tapered core member be incorporated as a part of piston rod 5 since it may be off-set as indicated by element 51a of FIGURE 6.

Spaced windings 52 and 53 are suitably supported and surround composite piston rod 5. Cylinder 2 is attached to valve casing 1 as before and other like parts are given like numerals as in FIGURE 1. Controller 54 has control arm 55 attached to projecting shaft 56 which may rotate the slide of a potentiometer or may move an inductive core or any other component. This may be a "Specialmatic" variable inductance as manufactured by Specialeties, Incorporated at Syosset, L.I., New York. In any event, the electrical output of controller 54 will vary with the relative position of arm 55 which may be manually set with respect to a scale or which can be manipulated by pivoted arm 57 linked with a moving part of a machine or other device. Current can be supplied to controller 54 through lines 58.

Alternating or pulsating direct current can be used in connection with the device of FIGURE 2 but it will be considered that alternating corrent is used. The output of controller 54 is supplied to primary winding 52 and to the input of amplifier 59 which is connected with electrical supply lines 58 which also feed electrical current to amplifier 60 the output of which is connected with electrical instrument 61. The input of amplifier 60 is connected with winding 53. The output of amplifier 59 is connected with another instrument similar to instrument 61 and these instruments may be placed in the same casing or in separate casings as illustrated in FIGURE 3. These instruments may be, essentially, ammeters, voltmeters, or the like.

Tubular shaft 62 of one instrument is rotated through an angle proportionate to the current strength of the output of amplifier 59, which current strength is varied according to the setting of controller arm 55. Contact arm 63, carrying contact 64, is attached to tube or sleeve 62 and arcuate member 65 of insulation material is attached to arm 63. Contact arm 66 carrying electrical contact 67 is attached to member 65. Shaft 68 of instrument 61 is rotatable through an angle dependent upon the strength of current supplied to instrument 61. This shaft carries a contact arm 72 having double contacts 69 one of which may be brought into contact with element 64 and the other of which may be brought into contact with element 67. Electrical line 46 is connected to shaft 68 by means of a flexible connection although a slip ring and brush may be used. Conductor 70 is connected to contact arm 66 through flexible connection 71. Line 46 could be connected with contact arm 72 which can be insulated from shaft 68, if desired.

Contact arm 63 is connected to conductor 73 through flexible connection 74 and conductor 73 is connected with one terminal of solenoid 32, the other terminal of which is connected with conductor 70 which is also connected to a terminal of solenoid 39. The other terminal of this solenoid is connected to line 45 which is connected to a terminal of solenoid 29 by means of conductor 75. The remaining terminal of solenoid 29 is connected to a terminal of switch 43 which is connected in series with switch 42 and conductor 49 as previously described. Conductor 49 is connected to line 46.

In operation, if a balanced condition exists, with contacts 69 separated from both contacts 64 and 67, then solenoids 32 and 39 will be deenergized and valve arm 34 will be held against stop 38 by the action of spring 36. In this position the valve element 15 will be in a position with channel 16 in register with port 11 and fluid pressure from pipe 23 will be transmitted through tube 10 to expand piston 8 to lock this piston in position relative to cylinder 2. Assuming that increase of current in both instruments causes clockwise displacement of arms 63 and 72, if it is desired to move piston 8 and rod 5 to the right the controller arm 55 will be rotated in a direction to reduce the current in winding 52 and in the instrument having movable contact arm 63. The result will be that contact arm 63 will seek a new stable position with respect to the spring of the instrument and so contact 64 will be swung to the left, touching contact 69. When this happens line 46 will be connected to line 45 through solenoids 32 and 39 in series and plunger 33 will be quickly pulled to the position shown to stop arm 34 which is being rotated counter clockwise by magnetized plunger 40. Therefore fluid will be admitted to cylinder 2 through port 17, and piston 8 and rod 5 will be moved to the right, fluid in cylinder 2 to the right of piston 8 being discharged through pipes 21 and 18.

Alternating current in primary winding 52 will induce alternating current in secondary winding 53 and the strength or amplitude of this induced current will depend upon the volume of iron core 51 between the windings. As rod 5 and core 51 are moved to the right the tapered core furnishes progressively less iron between the windings and so the current induced in winding 53 is progressivesy reduced as core rod 51 moves to the right. The amplified current fed to instrument 61 is therefore progressively reduced and contact arm 72 rotates contacts 69 counter clockwise until a new equilibrium point is reached, with contacts 69 not touching either contact 64 or 67. When this occurs solenoids 32 and 39 are deenergized and arm 34 is quickly returned to stop 38 so that pressure fluid is supplied to hollow piston 8 to lock it in place as described. In the meantime the piston 8 was continually moved to the right until the induced amplified current in unit 60 caused contacts 69 to reach a stable position with respect to the new stable position of contact arm 63 which position was determined by the setting of control arm 55. The movement of arm 72 may be caused, by means of damping or other time delay means, to be somewhat slower than the movement of arm 63 in order to insure that arm 72 will follow arm 63 satisfactorily.

When it is desired to move rod 5 to the left the arm 55 is rotated in a direction to increase current in the instrument having arm 63 and this arm is swung clockwise by the instrument to seek a new position. In doing so, the contact 67 is brought into contact with element 69 and so the circuit energizing solenoid 39 is closed, the solenoid 32 remaining deenergized. The result is that arm 34 is quickly pulled over against solenoid 39 and channel 14 is rotated into register with port 20, causing fluid under pressure to be supplied to cylinder 2 through pipe 21. The piston will therefore be moved to the left and fluid will be discharged from the left portion of the cylinder through L 26, port 12, recess 13, and pipe 18. As rod or core 51 in moved to the left the induced current in winding 53 is increased, causing increased amplified current to be supplied to instrument 61 by means of unit 60. This results in arm 72 being rotated clockwise until contact 69 breaks away from contact 67 after the latter reaches its new equilibrium position. Then solenoid 39 becomes deenergized and spring 36 quickly returns arm 34 to stop 38, and fluid is again supplied to piston 8 to expand it and to lock it. As previously described, solenoid 29 is momentarily energized to close valve 25 as channel 16 of valve element 15 is rotated past port 17.

Since the primary and secondary currents applied to the two instruments are amplified the device can be made very sensitive to movement of core member 51 and rod 5. Arm 55 can be adjusted to cause extremely small movements of the rod 5. A laminated core member comprising wires of iron or steel can be used if desired, as may a powdered iron core. If arm 55 is set manually a scale, as shown in FIGURE 6, will be useful.

The two instruments may be placed one above the other as illustrated in FIGURE 3. Instrument 61 has contact arm 72 carrying contact 69 which may be swung around to touch contact 64 which is rotated by the stem or shaft of instrument 61a. The two instruments are attached to supporting member 76. A double contact or yoke similar to elements 63 and 64 can be used in this modification, likewise.

FIGURE 4 shows a pressure lock which may be fastened to the cylinder or other support, outside of the cylinder. Relatively thin tube 77 is welded or otherwise sealed in opposite holes in casing 78. Fluid supply pipe 79 is sealed in a hole in casing 78. Piston shaft 5 is slidable through tube 77 and may be locked in any position relative thereto by admitting fluid under pressure to the interior of casing 78 through pipe 79. The liquid or gas under pressure will force tube 77 tightly against shaft 5 to lock it against relative movement. This construction has the advantage that an interior flexible tube like tube 10 need not be used.

In FIGURE 5 and other figures like parts will be indicated by like numerals. Relatively thin cylinder 2a is fitted within cylinder 2 and is spaced therefrom, the ends being sealed to provide a closed space between the cylinders except for fluid supply pipe 79a which is threaded or welded in an opening in cylinder or casing 2. Other parts not shown may be as in FIGURES 1 and 2. The device of FIGURE 5 shows modified piston locking means. When it is desired to lock the piston, fluid under pressure is admitted to the space between casing 2 and cylinder 2a, resulting in pressing thin cylinder 2a tightly against the piston thereby locking it and piston rod 5 against movement. The piston may be released by releasing the fluid pressure. The thin cylinder wall 2a will flex under pressure and will spring back upon release of pressure but the heavier wall 2 will be relatively rigid. This modification does not require a movable tube for locking the piston.

In FIGURE 6 a modified control system and associated electrical circuit are shown. In this modification the piston rod 5 is a tube and has inlet pipe 80 welded or otherwise fastened thereto. The piston 8 is constructed as shown in FIGURE 1 and tube 5 is connected with the interior of the hollow piston so that air, oil or other fluid can be forced through pipe 80 and tube 5 and into the piston to expand it. Flexible rubber, plastic, or other tube 10a connects pipe 80 with pipe 11a fastened in valve casing 1 and leading to valve port 11. Fluid discharge pipe 18 is as described before. Arm 82 is rigidly attached to tube 5 by means of integral collar 83 and arm 82 is attached to soft iron or steel rod 51a which may be laminated or divided into wires or small parts in order to reduce the effects of eddy currents. This rod is aligned parallel with piston rod or tube 5 and travels with that tube.

Elongated transformer 83 having a primary and a secondary winding is suitably supported in fixed relationship to cylinder 2. The core member or rod 51a is movable through a central or axial channel or space extending through unit 83. Alternating current is supplied to control unit 54 having adjustment handle or control arm 55 which can be turned with shaft 56 to rotate the wiper of a potentiometer or to vary an inductance or to adjust a variable impedance device of any suitable kind. Pointer 84 on shaft 56 may be set with respect to scale 85 to indicate any desired position of tube 5 and rod 51a within the capability of the device.

The adjusted alternating current output of unit 54 is connected with the primary winding of transformer 83 by means of conductors 86, which conductors are also connected with the input of amplifier-rectifier unit 87. This unit amplifies the alternating current fed into the primary winding and also rectifies this current, supplying direct current through conductors 88 and 89, the polarities being as indicated. Conductor 88 is connected to junction A of the bridge shown, through rectifier 100 arranged to pass current from unit 87 but not in reverse direction. Conductor 89 is connected to the bridge junction C. The bridge comprises resistors 90, 91, 92 and 93 and battery, generator, or other source 94 of direct current is connected to junctions A and B of the bridge, the positive terminal being connected to junction A through conductor 95 and the negative terminal of unit 94 being connected to junction B through conductor 96.

The secondary winding of transformer 83 is connected to the input of amplifier-rectifier 97 by means of conductors 98. The positive terminal of unit 97 is connected to junction A through rectifier 99 which passes current from the positive terminal to the junction but not in reverse direction. The negative terminal of unit 97 is connected to bridge junction D through conductor 101. Direct current motor 81 is fastened to valve cover plate 31 and its terminals are connected to junctions C and D by means of conductors 102 and 103. Rectifier 104 may be connected in conductor 95 to insure that current from unit 87 or 97 will not pass through source 94 in reverse direction.

Motor shaft 35a may be identical with valve rod 35 or the two may be connected. Motor 81 is a reversible type and may, if desired, be geared to the valve shaft 35. Arm 105 extends from motor shaft 35a and can be rotated through an angle on either side of its central position in which it is normally held by spring 106 the ends of which are fastened to pins in cover plate 31, the center of the spring being attached to arm 105. Stop 107 limits movement of the arm in counter clockwise direction and stop 108 limits movement of the arm in clockwise direction. These stops are fastened to plate 31. When arm 105 is in the central position shown the channel 16 of the valve rotor 15 is in register with passage 11 and pressure fluid is supplied to piston 8 through tube 10a, causing locking of the piston. Therefore the normal condition is for the piston and members 5 and 51a to be locked in position.

Pointer 84 can be set with respect to scale 85 to indicate various relative positions of core member 51a and transformer 83 or relative to any fixed reference. If it is assumed that pointer 84 and shaft 56 are rotated clockwise to increase current in the primary winding and in unit 87, then the rectified output of this unit will be increased as member 55 and the pointer are rotated clockwise and the primary current and output current of unit 87 will be reduced as pointer 84 is rotated counter clockwise. For every setting of pointer 84 there is only one position of member 51a which will cause the amplified, rectified current from unit 97 applied to resistor 93 to balance out the effect of the amplified, rectified current from unit 87 applied to resistor 90. As core member 51a is moved into transformer 83 the induced secondary current will be increased and as member 51a is moved to the right the induced secondary current will be decreased in magnitude due to less magnetic material being effectively in the transformer core.

After the bridge is balanced so that junctions C and D are at the same potential, any change of current through either leg 90 or 93 will unbalance the bridge so that current will flow to motor 81 through lines 102 and 103, the direction of the current being dependent upon which of these legs is carrying the greater net current. The bridge can be balanced with current source 94 in circuit as shown or it may be balanced with respect to units 87 and 97 alone. The electrical connections should be such that motor 81 will rotate arm 105 against stop 107 to let valve element 15 (FIG. 1) pass fluid to pipe 21 when it is desired that the piston move tube 5 and member 51a to the left. If then the bridge is unbalanced in opposite direction the motor will be urged in clockwise direction and arm 105 will be rotated against stop 108, to connect channel 16 with channel 17 leading into cylinder 2. Piston 8 will then be forced to the right. The arrangement of the ports is the same as that shown in FIGURE 1 except that ports 11 and 17 are inter-changed.

The exterior arrangement of the pipes is different from that shown in FIGURE 1 but the interior connections are as illustrated in FIGURE 1 with the exception that outlet 11a is connected with port 17, and port 11 leads into cylinder 2. Therefore the piston will be locked in position when unit 15 is in the position shown in FIGURE 1. It should be understood that the piston pressure is sufficient to overcome any magnetic pull of member 51a by the transformer windings.

In operation, if it is desired to move tube 5 and member 51a to the right to correspond to a new setting of pointer 84 relative to scale 85 then the setting is made and verniers, or various enlarging or amplifying devices may be used for increasing the accuracy of the scale setting. The adjustment of element 55 and shaft 56 is made to increase the current in the primary winding and to increase the amplified current in resistor 93 derived from current in the secondary winding. This latter current will be dependent upon the amount of iron in the core whereas the current in unit 87 is largely dependent upon the setting of pointer 84. If the induced current applied to unit 97 is relatively greater than the balancing current in unit 87 then the bridge will be unbalanced in a direction to cause motor 81 to swing arm 105 against stop 108 thus admitting fluid to the cylinder portion to the left of piston 8. Piston 8 will therefore move member 51a to the right to reduce the magnetic induction in the transformer thereby progressively reducing the magnitude of current in resistor 93 until the bridge is again balanced and no current blows to motor 81. Under this condition spring 106 holds arm 105 in central position and fluid is supplied to tube 10a to lock the piston and elements 5 and 51a in the new position.

If it is desired to move tube 5 and element 7 to the left the pointer is rotated in opposite direction so that current in unit 87 and in unit 97 will be reduced. The bridge in this case will be unbalanced in opposite sense and motor 81 will rotate arm 105 against stop 107 causing fluid to be admitted to pipe 21 to force piston 8 to the left. This will cause core member 51a to be moved into the transformer thereby increasing current in unit 97 and resistor 93 until the bridge is again balanced and the piston is expended and frictionally locked.

Additional core material may surround the transformer or may be placed adjacent thereto and the unbalanced bridge current in conductors 102 and 103 may be amplified in order to make the motor responsive to small changes of current. The rate of change of current in resistor 93 may be different from the rate of change in registor 90, relative to displacement of element 51a. If desired, the primary and secondary windings of transformer 83 may be spaced axially and core member 51a can be arranged to enter the secondary winding only. In this way the primary current can be made more nearly proportional to the setting of shaft 56 and will not be as much influenced by the movement of member 51a.

In FIGURE 7, the internal construction may be the same as illustrated in FIGURE 1. The fluid supply pipe 21 and discharge pipe 18 are shown on the opposite side of valve 1, however. Rack 109 is fastened to rod 5 and has spacing elbow 110 as shown. This rack is parallel with rod 5 and is meshed with gear 111 which is rotatable around stub shaft 112. This shaft and shaft 113 as well as other parts are suitably supported on a board or a base not shown. Metal, graphite, or other conductive contact arm 114 is movable over curved resistor 115 which is connected with an end of resistor 116 at junction E. Resistor 116 is connected with resistor 117 at junction F and resistor 117 is connected with curved resistor 118 at junction G.

Contact arm, wiper, or slide 119 is attached to knob 120 which is manually or automatically rotatable about shaft or pivot 113. Arms 114 and 119 are in contact with respective resistors 115 and 118 and are electrically connected with flexible conductors 121 and 122, respectively. These conductors may be insulated from gear 111 and knob 120. This gear and knob may be made of plastic or other non-conductive material. The conductors 121 and 122 are connected together at junction H and battery, or other direct current source 123 is connected across junctions F and H of the bridge comprising elements 116, 117, 115 and 118.

Resistors 124 and 125 are in series and connected to junctions E and G by conductors 126 and 127. Resistor 124 is connected between the cathode and grid of electronic tube 128 and in series with battery or other potential source 129 normally biasing tube 128 negatively practically to the point of cut off. Potential source 130 similarly normally biases electronic tube 131 negatively practically to the point of cut-off. The positive pole of direct current source 132 is connected through electromagnet 133 to the anode of tube 128 the negative pole of that source being connected to the tube cathodes which are connected together. Magnet 133 is fastened to plate 31 and similar, oppositely placed electro-magnet 134 is also attached to plate 31. Iron, steel or similar valve arm 135 is attached to valve stem 35 which performs a similar function as described in connection with the device shown in FIGURE 6. When magnet 133 is energized, the arm 135 will be attracted to set the valve element to pass liquid into cylinder 2 to force rod 5 in one direction and when valve arm 135 is attracted to energized magnet 134, as shown, the valve 1 will be set to pass liquid into cylinder 2 to cause movement of the rod 5 in opposite direction. Spring 106 normally holds valve arm 135 in a mid-position so that the hollow piston in cylinder 2 is locked, as described in connection with the device of FIGURE 6 although the fluid supply pipe 10 is in the cylinder as in FIGURE 1.

The positive terminal of direct current source 136 is connected to the anode of tube 131, through the winding of magnet 134 and the negative terminal of source 136 is connected to the cathodes of the tubes.

In operation, assume that valve arm 135 is held in mid position by spring 106 and that fluid is admitted to the piston in cylinder 2 to expand it, the piston being fastened to rod 5 as previously described. Under these conditions the bridge will be balanced and no current will flow through resistors 124—125 as a result of difference of potential between junctions E and G. If, however, wiper 119 is set to a different location relative to scale 137 indicating position of rod 5, then the bridge will be unbalanced and current will be passed through resistors 124—125 in a direction depending upon the direction of movement of contact arm 119. If junction E is at higher potential than junction G then the current will make the grid of tube 128 more positive relative to its cathode and the grid of tube 131 will be made more negative. The result is that the tube 128 will conduct current and magnet 133 will be energized to pull arm 135 over to it, setting the valve to cause movement of rod 5 in the desired direction.

If, for instance, the knob 120 is rotated clockwise through an angle to decrease the effective resistance of element 118 then current will flow through resistors 124—125 in a direction to cause tube 128 to conduct and valve 1 will admit fluid to cylinder 2 so that the piston and rod 5 are moved to the right. This causes rack 109 to rotate gear 111 clockwise to reduce the effective resistance of element 115 in circuit with arm 114. The movement continues until the bridge is balanced again and tube 128 is cut off, thereby deenergizing magnet 133.

Spring 106 then holds arm 135 in mid-position causing the piston to be locked in position.

If arm 119 is rotated in direction to increase the effective resistance of element 118 then the unbalanced bridge current will flow through resistors 125—124 in opposite direction and the grid of tube 121 will be made positive or more positive and the grid of tube 128 will be made more negative. Therefore magnet 134 will be energized to pull valve arm 135 over as shown and rod 5 will be moved to the left until the bridge is balanced again and the piston is locked. The arm 119 may be rotated manually or it may be connected to a movable member of a machine or device of any suitable kind. Solenoids may be substituted for magnets and the unbalanced bridge currents passing through resistors 124—125 may be amplified if desired. Components 128 and 131 may be hard tubes, thyratrons, transistors, or other suitable electrical current control devices.

Various modifications of the devices I have disclosed can be made without departing from the broad principles of my invention. For illustration, it would be possible to fix the piston and to have the cylinder movable. The valves can also be fixed or movable with the cylinder. Flexible fluid connections can be made. If the cylinder moves, then rods or similar core members may be attached to the cylinder or the cylinder itself can be used as a movable core. In such cases I consider that the words "piston" and "cylinder" as used in the claims may be traded one for the other and that the claims will cover such modifications.

In FIGURE 1, valve 25 may be a rate valve and may include a compensator for different pressures. Such valves are known. This valve may be programmed for different pressures. The flow control or rate valve 25 may be placed in the high pressure supply pipe as shown or it could be placed in the exhaust side of the system, for example in pipe 18. The compensator, which may comprise a valve with a notched plug, should be adjustable for various rates for cylinders of different size. Many flow control valves have ranges and, if used, by-pass control may be employed. The valves described may be used with any of the modifications shown.

What I claim is:

1. In a control device, a cylinder, piston means relatively movable therein, means including valve means for supplying fluid to said cylinder to cause movement of said piston means, first electromagnetic means for controlling said valve means, second electromagnetic means for controlling said first electromagnetic means, means inductively connected with said second electromagnetic means to cause variable adjustment thereof, said inductively connected means including means carried by said piston means, and means for fastening said piston means against movement.

2. In a control device, a cylinder, a piston relatively movable in said cylinder, a piston rod fastened to said piston and extending outside of said cylinder, a primary winding surrounding said rod, means for supplying varying electrical current of predetermined magnitude to said winding, a secondary winding spaced from said primary winding and surrounding said rod, valve means for controlling flow of fluid to said cylinder, electrical means for controlling said valve means, electrical switch means connected in circuit with said valve control electrical means and electrically connected with said primary and secondary windings to be controlled by currents therein, said piston rod causing variation of the mutual inductance between said windings in accordance with the position of said rod relative thereto, and means for fastening said piston against movement relative to said cylinder.

3. The device as described in claim 2, said piston rod including a tapered magnetizable rod carried thereby.

4. In a control device, a cylinder, piston means relatively movable therein, means including valve means for supplying fluid to said cylinder to cause movement of said piston means, first electro-magnetic means for controlling said valve means, second electro-magnetic means for controlling said first electro magnetic means, means inductively connected with said second electro magnetic means to cause variable adjustment thereof, said inductively connected means including means carried by said piston means, and means for fastening said piston means against movement, said fastening means including means for supplying fluid to said piston to cause expansion thereof.

5. In a control device, a cylinder, a piston relatively movable in said cylinder, a tapered magnetizable piston rod fastened to said piston and extending outside of said cylinder, a primary winding adjacent said rod, a secondary winding adjacent said rod and spaced from said primary winding, means for supplying varying electrical current of predetermined magnitude to said primary winding, means including valve means for controlling flow of fluid to said cylinder, means including electrical means for setting said valve means in a plurality of predetermined positions, electrical switch means connected in circuit with said electrical valve setting means and electrically connected with said primary and secondary windings to be controlled by currents therein, and means for fastening said piston against movement relative to said cylinder.

6. The device as described in claim 5, said fluid flow controlling means including means for supplying fluid to said cylinder to cause movement of said piston in opposite directions.

7. The device as described in claim 5, said piston being hollow and radially expansible, and said fastening means including means for supplying fluid under pressure to the interior of said hollow piston.

8. The device as described in claim 5, said piston being hollow, and said valve means being settable in three positions to cause, respectively, flow of fluid to said cylinder to produce movement of said piston in one direction, to cause flow to said cylinder to produce movement of said piston in the opposite direction, and to cause flow of fluid to the interior of said piston to cause expansion thereof against the cylinder wall.

References Cited in the file of this patent

UNITED STATES PATENTS

| | | |
|---|---|---|
| 2,278,396 | Saur | Mar. 31, 1942 |
| 2,546,596 | Haines | Mar. 27, 1951 |
| 2,644,427 | Sedgfield et al. | July 7, 1953 |
| 2,837,017 | Hough | June 3, 1958 |
| 2,906,095 | Whitehead | Sept. 29, 1959 |
| 2,949,895 | Reuter | Aug. 23, 1960 |
| 2,969,772 | Cahill | Jan. 31, 1961 |
| 2,977,765 | Fillmore | Apr. 4, 1961 |

FOREIGN PATENTS

| | | |
|---|---|---|
| 749,695 | Great Britain | May 30, 1956 |